(12) United States Patent
Lee et al.

(10) Patent No.: US 9,298,292 B2
(45) Date of Patent: Mar. 29, 2016

(54) METHOD AND APPARATUS FOR MOVING OBJECT IN TERMINAL HAVING TOUCH SCREEN

(71) Applicant: Samsung Electronics Co., Ltd, Gyeonggi-do (KR)

(72) Inventors: Kiwon Lee, Gyeonggi-do (KR); Sangheon Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 272 days.

(21) Appl. No.: 13/900,406

(22) Filed: May 22, 2013

(65) Prior Publication Data

US 2013/0321308 A1  Dec. 5, 2013

(30) Foreign Application Priority Data

May 30, 2012 (KR) .................... 10-2012-0057152

(51) Int. Cl.
 *G06F 3/041* (2006.01)
 *G06F 3/0488* (2013.01)
(52) U.S. Cl.
 CPC ............ *G06F 3/041* (2013.01); *G06F 3/04883* (2013.01)

(58) Field of Classification Search
 CPC ............................ G06F 3/041; G06F 3/04883
 USPC .......................................................... 345/173
 See application file for complete search history.

(56) References Cited

U.S. PATENT DOCUMENTS

2010/0045705 A1* 2/2010 Vertegaal et al. ............. 345/661
2010/0229090 A1* 9/2010 Newton et al. ................ 715/702
2012/0274581 A1* 11/2012 Kim .............................. 345/173

FOREIGN PATENT DOCUMENTS

KR  10-2011-0062569  6/2011
KR  10-2012-0006403  1/2012

* cited by examiner

*Primary Examiner* — Viet Pham

(57) ABSTRACT

Provided are a method and an apparatus for moving an object in a terminal having a touch screen. The method of moving an object in a terminal having a touch screen, includes detecting a first touch on the touch screen, determining whether a contact time of multi-touch exceeds a threshold time when the first touch is the multi-touch, changing an operation mode of the terminal from a standby mode to a moving mode when the contact time of the multi-touch exceeds the threshold time, and moving an object in response to motion of second touch when the operation mode of the terminal is the moving mode.

10 Claims, 19 Drawing Sheets

<MOVING MODE>

<STANDBY MODE>

<MOVING MODE>

<MOVING MODE>

<STANDBY MODE>

<MOVING MODE>

<MOVING MODE>

<MOVING MODE>

METHOD AND APPARATUS FOR MOVING OBJECT IN TERMINAL HAVING TOUCH SCREEN

CROSS-REFERENCE TO RELATED APPLICATION(S) AND CLAIM OF PRIORITY

The present application is related to and claims the benefit under 35 U.S.C. §119(a) of a Korean patent application No. 10-2012-0057152 filed on May 30, 2012 in the Korean Intellectual Property Office, the entire disclosure of which is hereby incorporated by reference.

TECHNICAL FIELD

The present invention relates to a method and an apparatus for moving an object(s) in a terminal having a touch screen.

BACKGROUND

A portable terminal may be a necessity in modern people. That is, a portable terminal is used regardless of age or sex, and has been used as a medium capable of performing wireless audio call and information exchange. At the beginning, a mobile terminal was recognized as a communication device for wireless calling. With the development of technology, a portable terminal provides various functions. For example, a recent portable terminal may provide various functions such as a game, an e-mail, a music player, a schedule management function, a digital camera, and a wireless Internet service. Meanwhile, the portable terminal has a tendency to include a touch screen.

The recent portable terminal may provide various functions executed by a touch gesture of a user. In particular, a long touch of the touch gesture may be used to change a location of an object (e.g., icon). For example, the user may long-touch (e.g., touch for 2 seconds or longer) one of the application icons on a touch screen by a touch input means (e.g., finger). Then, a portable terminal may detect the long-touch, and highlight a corresponding icon in response to the long-touch. The user may move touch input means after the long-touch. Then, the portable terminal detects motion of the touch input means, and displays the motion of the highlighted icon in response to the motion of the touch input means. The user may stop the motion of the touch input means, and release the touch of the touch input means at the stopped location. Then, the portable terminal detects the release of the touch, and displays the icon at the touch released location in response to the touch release.

The long touch can be used in other functions (e.g., display detailed information of an object). For example, when a hyperlink is long-touched on a browser, a pop-up menu for displaying detailed information of the hyperlink may be displayed. As described above, when a long touch is used to display the detailed information, it is impossible to change the location of the object starting from the long touch. If the object is long-touched, a portable terminal may display a pop-up window for inquiring which function will be executed and can execute a selected function (e.g., select one from displayed detailed information and change in a location) through the pop-up window. However, a user may have a difficulty in selecting a function through the pop-up window.

SUMMARY

To address the above-discussed deficiencies of the prior art, it is a primary object to provide a method and an apparatus for moving an object in a terminal having a touch screen.

The present invention further provides a method allowing a user to use an object using multi-touch, and an apparatus thereof.

The present invention further provides a method of executing motion of an object through multi-touch and executing other functions (e.g., display of detailed information of a corresponding object) through single touch, and an apparatus thereof.

In accordance with an aspect of the present invention, a method of moving an object in a terminal having a touch screen, the method includes detecting a first touch on the touch screen, determining whether a contact time of multi-touch exceeds a threshold time when the first touch is the multi-touch, changing an operation mode of the terminal from a standby mode to a moving mode when the contact time of the multi-touch exceeds a threshold time, detecting a second touch on the touch screen and moving an object in response to motion of second touch when the operation mode of the terminal is the moving mode.

In accordance with another aspect of the present invention, a portable terminal includes a touch screen configured to provide a user interface for mutual operation with a user, and a controller configured to control the touch screen, wherein the controller is configured to detect a first touch on the touch screen, determines whether a contact time of multi-touch exceeds a threshold time when the first touch is the multi-touch, to change an operation mode of the terminal from a standby mode to a moving mode when the contact time of the multi-touch exceeds a threshold time, and to control the touch screen to display motion of an object in response to motion of second touch when the operation mode of the terminal is the moving mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

The method and the apparatus for moving an object according to an embodiment of the present disclosure are applied to a terminal having a touch screen, such as a multi-media device such as a smart phone, a tablet PC, a notebook PC, a desktop PC, a TV, a navigation device, and a video phone. The method and the apparatus for moving an object according to an embodiment of the present disclosure are applicable to a device having a communication function and a touch screen, e.g. refrigerator.

Hereinafter, the movement of the object can include cut & paste or copy & paste. That is, a copy & paste or a cut & paste can be performed on an object(s) as the object(s) moves from the first location to the second location.

Figure 1:
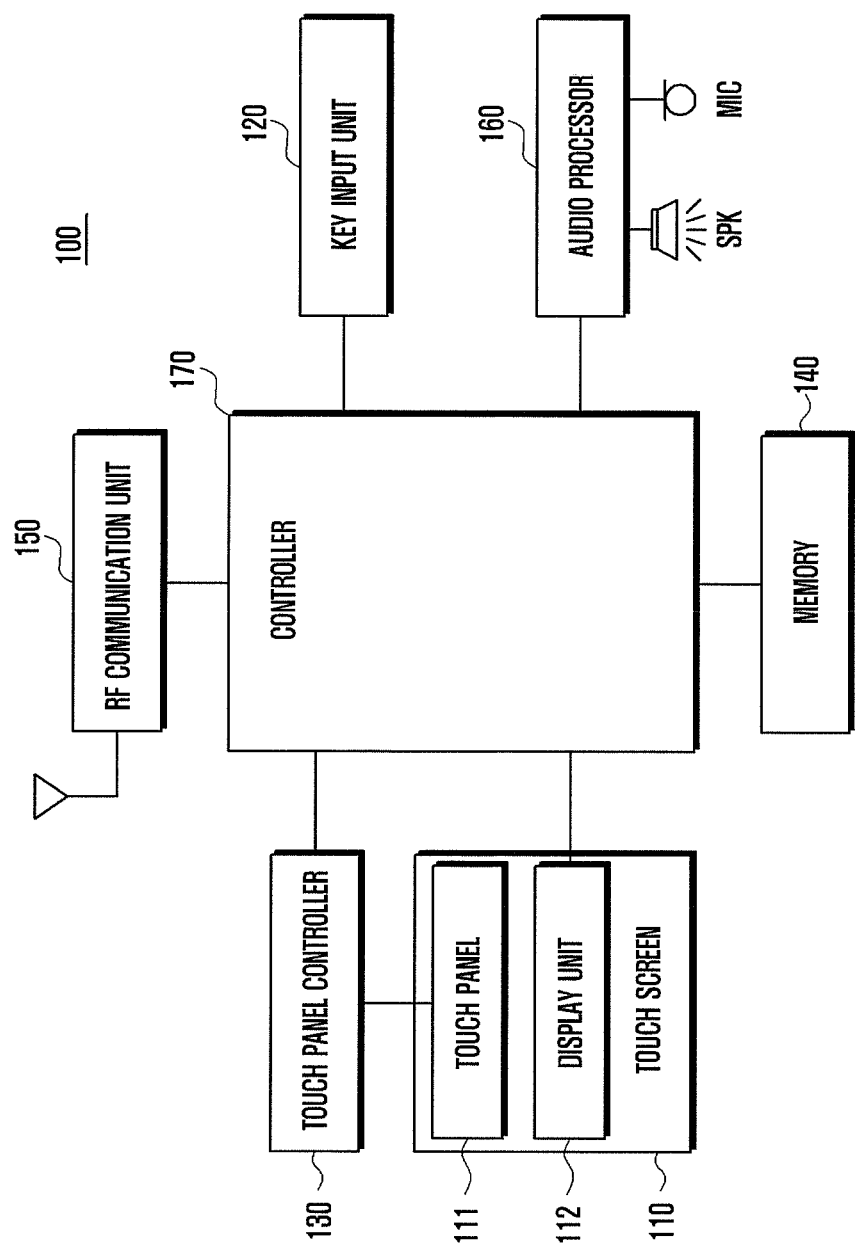
FIG. 1 is a high level block diagram illustrating a configuration of a terminal according to one exemplary embodiment of the present disclosure.

FIG. 1 is a high level block diagram illustrating a configuration of a terminal according to an exemplary embodiment of the present disclosure. Referring to FIG. 1, the terminal 100 can include a touch screen 110, a key input unit 120, a touch panel controller, a memory 140, a radio frequency (RF) communication unit 150, an audio processor 160, a speaker SPK, a microphone MIC, and a controller 170.

The touch screen 110 includes a touch panel 111 and a display unit in order to provide a user interface for mutual communication with a user. The touch panel 111 can be placed on the display unit 112, and generates a signal (e.g., touch event) in response to a user gesture input to the touch panel 111 and transfer the generated signal to the controller 170.

The touch panel 111 can be classified into an add-on type touch panel which is placed on the display unit 112 and an on-cell type touch panel or an in-cell type touch panel which is embedded in the display unit 112. The controller 170 can detect a user gesture from a touch event from the touch screen to control other constituent elements. The user gesture is mainly classified into a touch and a touch gesture. The touch gesture can include tap, double tap, long tap, drag, drag & drop, flick, and press. The touch is an operation where a user contacts the touch input mean (e.g., finger or stylus pen) on one point. The tap is a gesture where the user touches-off a corresponding point without movement after touching the touch input mean on one point. The double tap is an operation where a user continuously taps one point twice. The long tap is an operation where touch of the touch input means is released from a corresponding point without motion of the touch input means after touching one point longer than the tap. The drag is an operation that moves the touch input means in a predetermined direction in a state that one point is touched. The drag & drop is an operation that touches-off the touch input means after dragging the touch input means. The flick is an operation that touches-off after moving the touch input means at higher speed than the drag by bouncing. The press is an operation which pushes a corresponding point by the touch input means after touching one point. That is, the touch refers to a state that the user contacts the touch screen, and the touch gesture refers to motion of the touch from contact of the touch on the touch screen to touch-off. The touch panel includes a pressure sensor to detect pressure of a touched point. Detected pressure information is transferred to the controller 170, and the controller 170 can identify the touch and the press based on the detected pressure information. Further, a resistive type, a capacitive type, and an electromagnetic induction type are applicable to the touch panel 111.

The display unit 112 displays image data under the control of the controller 170. That is, the display unit 112 can provide various screens such as a lock screen, a home screen, an application (hereinafter referred to as 'App') execution screen, and a key pad screen according to usage of the terminal 100. If the display unit 112 is turned on, a locked screen can be displayed on the display unit 112. If a touch gesture for releasing a lock is detected, the controller 170 can change the displayed image from a locked screen to a home screen or an App execution screen. The home screen can be include a plurality of App icons corresponding to respective Apps. If one is selected from the App icons by e.g., tapping an icon by the user, the controller 170 can execute the corresponding App, for example, a video player, and display a video in an execution window on the display unit 112.

The display unit 112 can display one of the screens as a background, and can display the other screen overlapping with the background as a foreground under the control of the controller 170. For example, the display unit 120 can display the App execution screen and display a key pad on the App execution screen. The display unit 112 can display a plurality of screens under the control of the controller 170. For example, the display unit 112 can display a second App execution screen on a second screen region of the touch screen 110 while displaying a first App execution screen on a first screen region of the touch screen 110.

The display unit 112 can adopt a flat panel display panel form such as a Liquid Crystal Display (LCD), an Organic Light Emitted Diode (OLED), or an Active Matrix Organic Light Emitted Diode (AMOLED).

The key input unit 120 can include a plurality of input keys and function keys for receiving input of numerals or character information, and setting various functions. The function keys can include arrow keys, side keys, and hot keys set to perform a certain function. Further, the key input unit 120 generates key signals associated with user setting and function control of the terminal 100 and transfers the generated key signals to the controller 170. The key signals can include a power on/off signal, a volume control signal, and a screen on/off signal. The controller 170 controls the foregoing structural elements according to the key signals. The key input unit 120 can be implemented by a QWERTY key pad, a 3*4 key pad, and a 4*3 key pad having a plurality of keys. Further, when a touch panel 111 is supported in the form of a full touch screen, the key input unit 120 can include at least one side key for screen on/off and on/off of the terminal 100, which is provided at a side of a case of the terminal 100.

The touch panel controller 130 is connected to the touch panel 111, receives a touch event from the touch panel 111, converts the received touch event into a digital signal, and transfers the digital signal to the controller 170. The controller 170 detects a touch gesture from the touch event from the touch panel event 130. That is, the controller 170 can detect a touched point, a moving distance, a moving direction, speed and pressure of a touch.

The memory 140 can include a data area and a program area. The data area of the memory 140 can store data created from the terminal 100 according to the usage of the mobile terminal 100 or downloaded from the outside. The data area can store the screens. Further, the data area can store various setting values (e.g., screen brightness, presence of vibration upon generation of touch, presence of automatic rotation of a screen).

The memory 140 stores various programs. In detail, the memory 140 can include an operating system (OS) for operating booting of the terminal 100, a communication program, an image processing program, a display control program, a user interface program, an embedded application, and a 3rd party application. The communication program includes commands capable of communicating with an external device through an RF communication unit 150. A graphics program includes various software constituent elements for displaying graphics on the touch screen 110. Here, the graphics can include texts, web pages, icons, digital images, videos, and animations. The graphics program includes a command controlling such that graphics corresponding to a function executed by the controller 170 are displayed on the touch screen 110. The user interface program includes various software constituent elements associated with a user interface. The embedded application signifies an application which is basically mounted in the terminal 100. For example, the embedded application can be a browser, an e-mail, or an instant messenger. The $3^{rd}$ application signifies an application which can be downloaded and installed in the terminal 100 from an on-line market. The $3^{rd}$ application is freely installed and removed. For example, the $3^{rd}$ application can be Facebook and Twitter.

The RF communication unit 150 performs a voice call, a videophone call, or data communication under the control of the controller 170. To this end, the RF communication unit 150 can include an RF transmitter for up-converting a frequency of a signal for transmission and amplifying the signal, and an RF receiver for low-noise-amplifying a received signal and down-converting a frequency of the signal. Further, the RF communication unit 150 can include a mobile communication module (third Generation (3G) mobile communication module, 3.5-Generation (3.5G) mobile communication module, fourth Generation (4G) mobile communication module, or the like), a digital broadcasting mode (e.g., DMB module), and a near distance mobile module (e.g., wireless fidelity (Wi-Fi) module), and a Bluetooth module).

The audio processor 160 performs input and output functions of an audio signal for voice recognition, voice duplication, digital recording, and phone functions in connection with the speaker SPK and the microphone MIC. That is, the audio processor 160 can perform a function which outputs an audio signal through the speaker SPK and receives the audio signal through the microphone MIC. The audio processor 160 receives audio data from the controller 170, converts the received audio signal into an electric signal, and provides the electric signal to the speaker SPK. The audio processor 160 receives the electric signal from the microphone MIC, converts the received electric signal into audio data, and provides the audio data to the controller 170. The speaker SPK converts an electric signal received from the audio processor 160 into a sound wave, and outputs the sound wave. The microphone MIC converts a sound wave from a person or sound sources into an electric signal.

The controller 170 can control an overall operation of the terminal 100 and signal flow between internal blocks of the terminal 100, and execute a function processing data. Further, the controller 170 controls supply of power from a battery to internal constituent elements. A detailed function of the controller 170 according to the present disclosure will be described below.

Since the structural elements can be variously changed according to convergence trend of a digital device, no elements can be listed. However, the terminal 100 according to the present disclosure can further include constituent elements which are not described such as a broadcasting receiver, e.g., DMB module, a GPS module, and a camera module. Further, specific elements in the foregoing arrangements of the terminal 100 of the present disclosure can be omitted or substituted by other elements according to the provided form.

Figure 2:
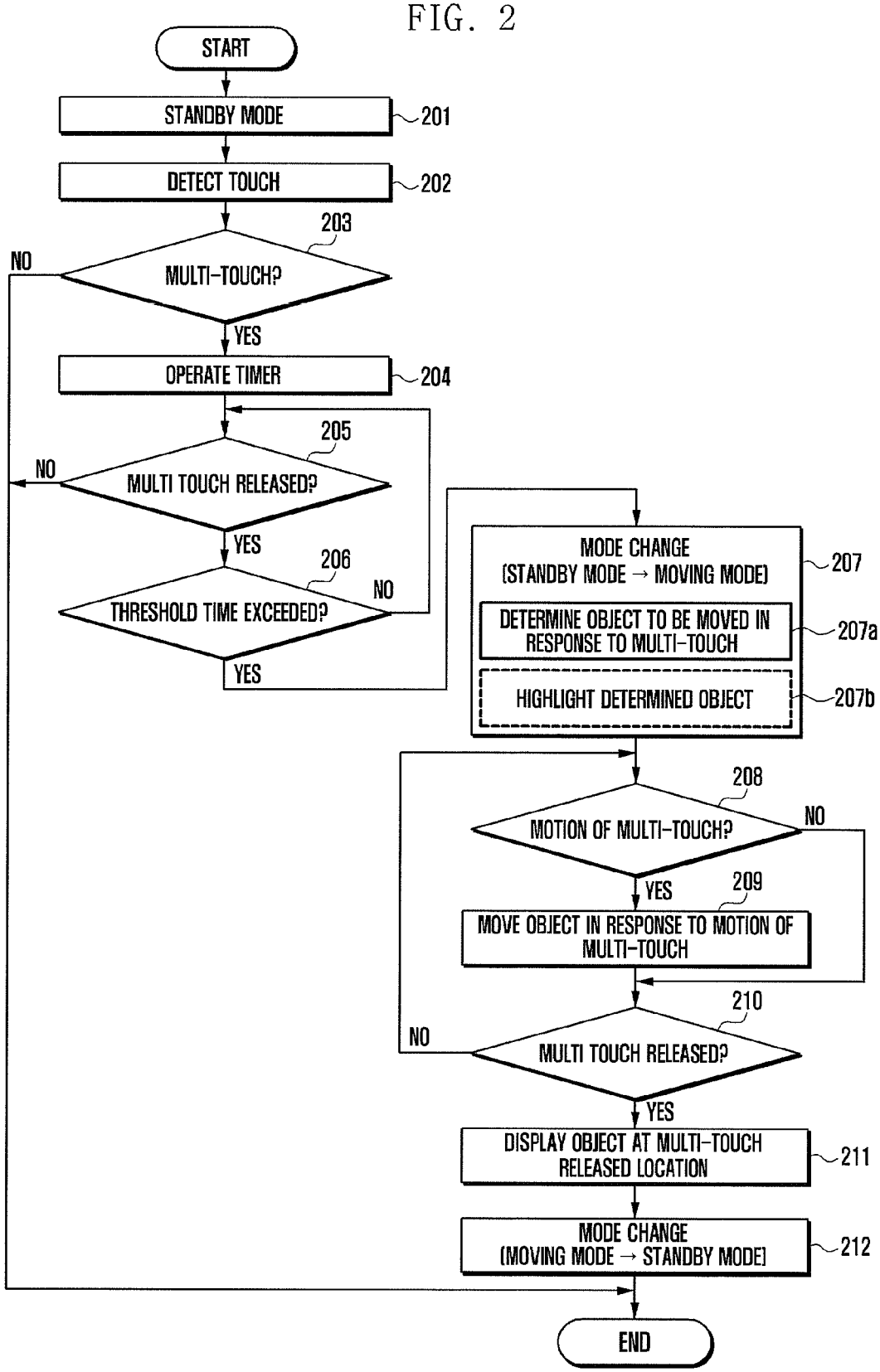
FIG. 2 is a flowchart illustrating a method of moving an object(s) according to another embodiment of the present disclosure.

FIG. 2 is a flowchart illustrating a method of moving an object(s) according to one embodiment of the present disclosure.

Referring to FIG. 2, a controller 170 can operate in a standby mode which waits for a user input (201). The touch screen 110 can display at least one of various screens in the standby mode under the control of the controller 170. For example, the touch screen 110 can display a home screen including a plurality of App execution icons. Further, the touch screen 110 can display one screen (e.g., browser screen) to be overlapped with other screen (e.g., key pad). The touch screen 110 can display a plurality of screens (e.g., a first folder screen and a second folder screen including a plurality of thumbnails, respectively) not to be overlapped with each other.

The controller 170 can detect a touch on the touch screen 110 while being operated in the standby mode (202).

When the touch is detected, the controller 170 determines whether the detected touch is a multi-touch (203). That is, the controller 170 determines whether contacts with respect to the touch screen 110 are detected on a plurality of touched regions.

When a multi-touch is detected, the controller 170 starts a timer (204). That is, the controller 170 counts a time from a detected time point of the multi-touch.

The controller 170 determines whether a release of the multi touch is detected (205). When the release of the multi touch is detected on the touch screen 110, the controller 170 determines whether a contact time of the multi-touch exceeds a threshold time (206). When the contact time of the multi-touch does not exceed the threshold time, the process can return to step 205. The multi-touch can be released in a state that the contact time of the multi-touch does not exceed the threshold time. For example, the user can release the multi-touch (that, multi-tap) within 2 seconds. When the multi-tap is detected, the controller 170 can execute a function corresponding to the multi-tap (e.g., display detailed information of hyperlink).

When the contact time of the multi-touch exceeds the threshold time (e.g., when 2 seconds elapse after multi-touch is detected), the controller 170 changes an operation mode from a standby mode to a moving mode (207). The controller 170 can move various contents (e.g., thumbnails, folders, texts, images, icons) in the moving mode in response to a touch gesture. In detail, the controller 170 determines an object to be moved in response to the multi-touch (207a). For example, the controller 170 can determine the multi-touched contents as the object to be moved. Further, the controller 170 can set a moving region based on touched regions (e.g., the first touched region and the second touched region), and can determine content located in the moving region as an object(s) to be moved. The controller 170 highlights the contents determined as an object(s) to be distinguished from other contents (207b). For example, the touch screen 110 can display a thicker outline of the object under the control of the controller 170. The touch screen 110 can display the outline of the determined object with a different color from a color (red) of an outline of the other objects. Alternatively, the touch screen 110 can display the object(s) with shaking animation. In some embodiments, step 207b can be omitted.

The controller 170 determines whether motion of the multi-touch is detected (208). When the motion of the multi-touch is detected, the controller 170 moves the object in response to the motion of the multi-touch (209). That is, the touch screen 170 displays the motion of the object under the control of the controller 170 (209). In this case, the object can be directly moved. The object is not moved but an image representing the object can be moved. When the motion of the multi-touch is detected at step 208, the process can omit step 209 but go to step 210.

The controller 170 determines whether a release of the multi touch is detected (210). When a release of the multi touch is not detected at step 210, the process can return to step 208. When a release of the multi touch is detected at step 210, the controller 170 can fix the object to a multi touch released location (211). In other words, the touch screen 110 displays the object at the multi-touch released location under the control of the controller 170 (211). For example, the multi-touch is a two-point touch, one point touch can be touched-off at the first touched region and the other point touch can be touched-off at the second touched region in the two-point touch. It is assumed that the center coordinate of the first touched region is (x1, y1) and the center coordinate of the second touched region is (x2, y2). In this case, the location of the placed object can be determined based on $((x_1+x_2)/2, (y_1+y_2)/2)$. For example, there can be a movement candidate group and the object can be fixed to a candidate closest to $((x_1+x_2)/2, (y_1+y_2)/2)$. The fixed location of the object can be determined based on only the center coordinates of the first touched region or only the center coordinates of the second touched region.

As described above, if a multi-touch is released, an object(s) can be fixed to a multi-touch off location. When a multi-touch is released, the controller 170 changes the operation mode from the moving mode to the standby mode (212).

The controller 170 can perform a function corresponding to a multi touch released location (211). The functions are various, for example, when the object is a thumbnail representing a photograph, the controller 170 can control the touch screen 110 to display the photograph at the multi touch released location. When the object is an icon indicating a video, the controller 170 can control the touch screen 110 so that the video is played at the multi touch released location. In some embodiments, if the multi-touch is released, the controller 170 can control the RF communication unit 150 to transmit a corresponding data to the external, e.g., cloud server.

Referring to FIG. 2, when a multi-touch is released, the operation mode is changed from the moving mode to the standby mode. In some embodiments, however, the operation can maintain the moving mode although a multi-touch is released. The embodiments will be described with reference to FIG. 3.

Figure 3:
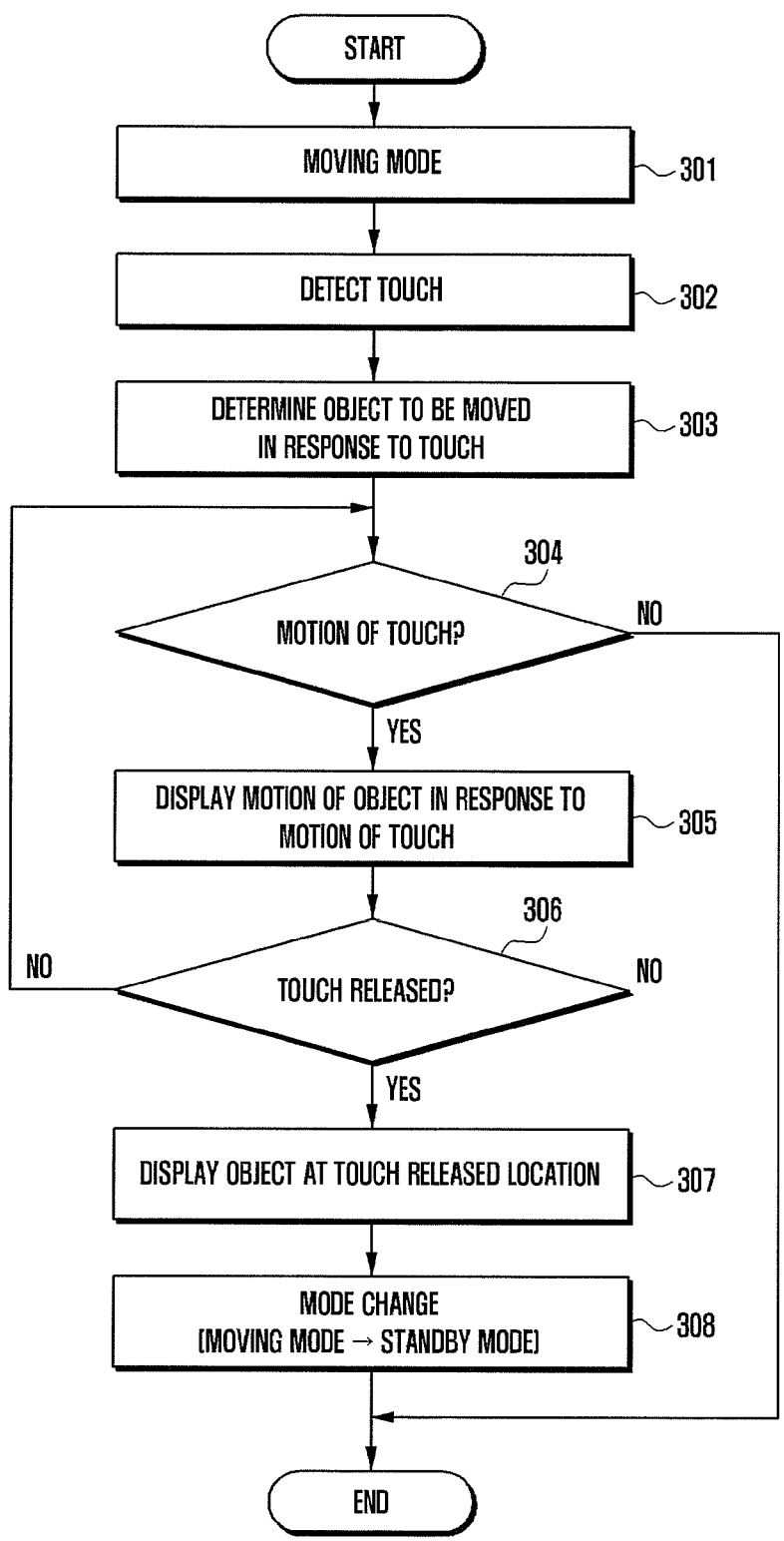
FIG. 3 is a flowchart illustrating a method of moving an object(s) according to another embodiment of the present disclosure.

FIG. 3 is a flowchart illustrating a method of moving an object(s) according to another embodiment of the present disclosure.

Referring to FIG. 3, a controller 170 can operate in a moving mode where an object is movable according to a touch gesture (301). If the multi-touch is detected and a threshold time (e.g., two seconds) elapse after the multi-touch is detected, the controller 170 can change the operation mode from the standby mode to the moving mode. The controller 170 can provide feedback guiding that the operation mode is changed to the moving mode to the user. For example, the audio processor 160 can output audio data (e.g., effect sound or guide sound) associated with the mode change through a speaker SPK. The touch screen 110 can display a pop-up message guiding the mode change for, e.g., two seconds under the control of the controller 170. The touch screen 110 can display objects with shaking animation. A user can recognize that the operation mode is changed from the standby mode to the moving mode and can release the multi-touch based on the feedback. In this case, even if the multi-touch is released, the operation mode remains to be the moving mode.

The controller 170 can detect touch (e.g., one touch or multi-touch) on the touch screen 110 while being operated in the moving mode (302). Hereinafter, in a description with reference to FIG. 3, it is assumed that the detected touch is one-point touch. When the touch is detected, the controller 170 determines an object(s) to be moved in response to the touch (303), for example, the touched one.

The controller 170 determines whether a motion of the touch is detected (304). When a motion of the touch is detected, the controller 170 moves the object according to the motion of the touch (305). That is, the touch screen 110 displays the movement of the object under the control of the controller 170 (305).

The controller 170 determines whether a release of a touch is detected (306).

When a release of a touch is detected at step 306, the process can return to step 304. When a release of a touch is detected at step 306, the controller 170 fixes the object(s) to the touch released location (307). In other words, the touch screen 110 displays the object at the touch released location (307). For example, the object can be fixed based on center coordinates of a touched region. The object can be fixed to a candidate of the moving candidate group closest to the center coordinates.

As described above, if the touch is off, the object can be fixed to the touch released location. When the touch is released, the controller 170 can change the operation mode from the moving mode to the standby mode (308). However, even if the touch is released, the operation mode can maintain the moving mode. In this case, the change from the moving mode to the standby mode can be achieved by a separate touch gesture. For example, when the multi-touch is detected while being operated in the moving mode and a threshold time (e.g., two seconds) elapses after the multi-touch is detected, the controller 170 can change the operation mode from the standby mode to the moving mode. That is, the multi-touch can be used to change the mode. When the user multi-touch the touch screen 110 for, i.e. two seconds or longer, the operation mode can be changed from the standby mode to the moving mode. When the user again multi-touches the touch screen 110 for, i.e., two seconds or longer, the operation mode can be changed from the moving mode to the standby mode.

As illustrated with reference to FIGS. 2 and 3, motion of the contents is performed according to motion of the touch. In other words, FIGS. 2 and 3 are embodiments illustrating motion of contents using a drag.

Hereinafter, the motion of the contents using flick will be described with reference to FIG. 4.

Figure 4:
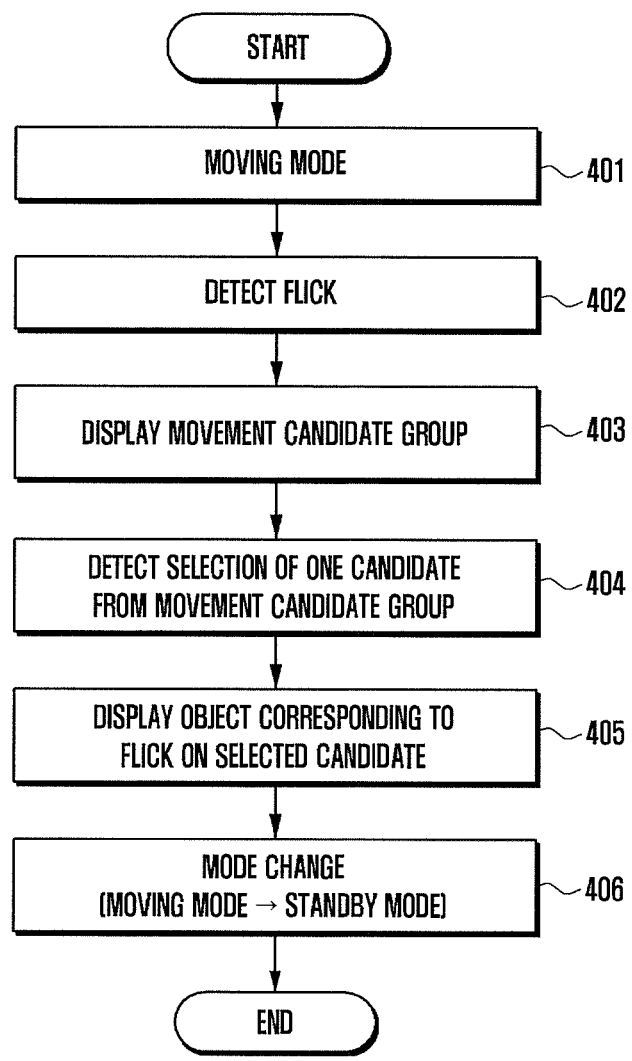
FIG. 4 is a flowchart illustrating a method of moving an object(s) according to another embodiment of the present disclosure.
Figure 5:
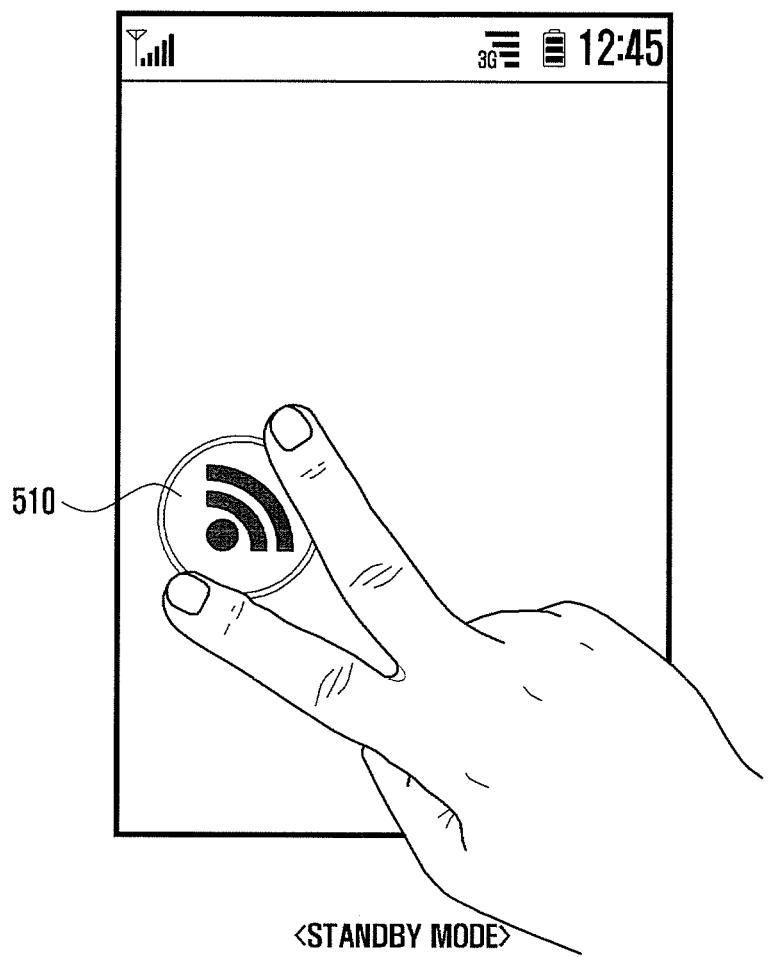
FIGS. 5 to 8 are exemplary screen diagrams illustrating a method of moving an object(s) according to another embodiment of the present disclosure.
Figure 6:
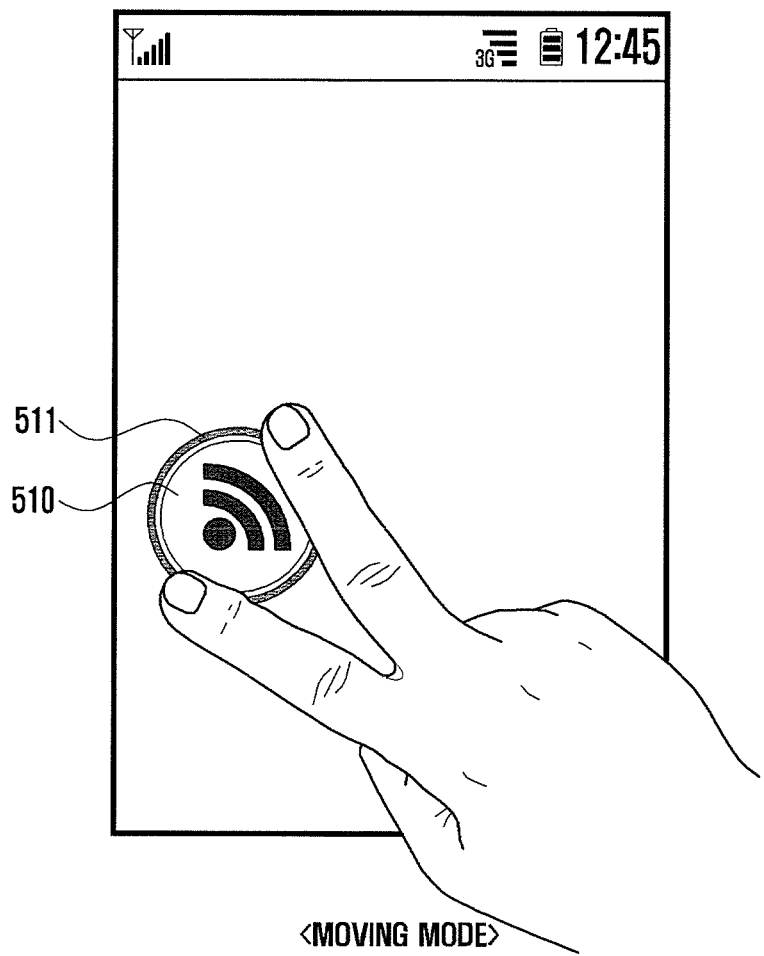
Figure 7:
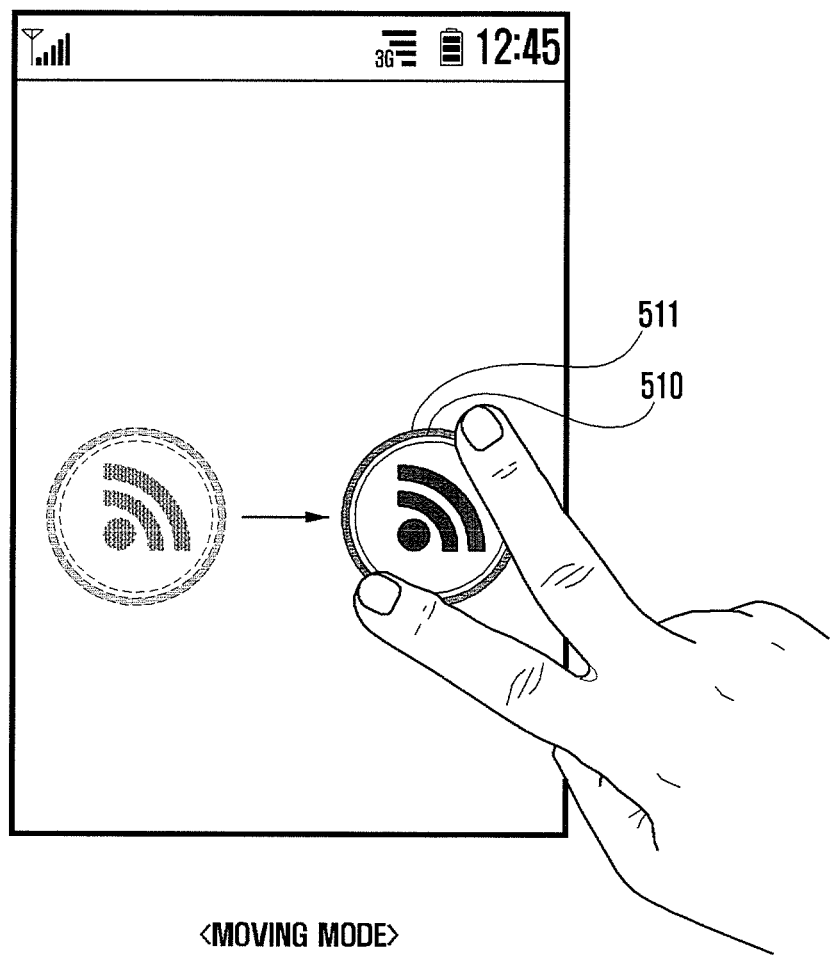
Figure 8:
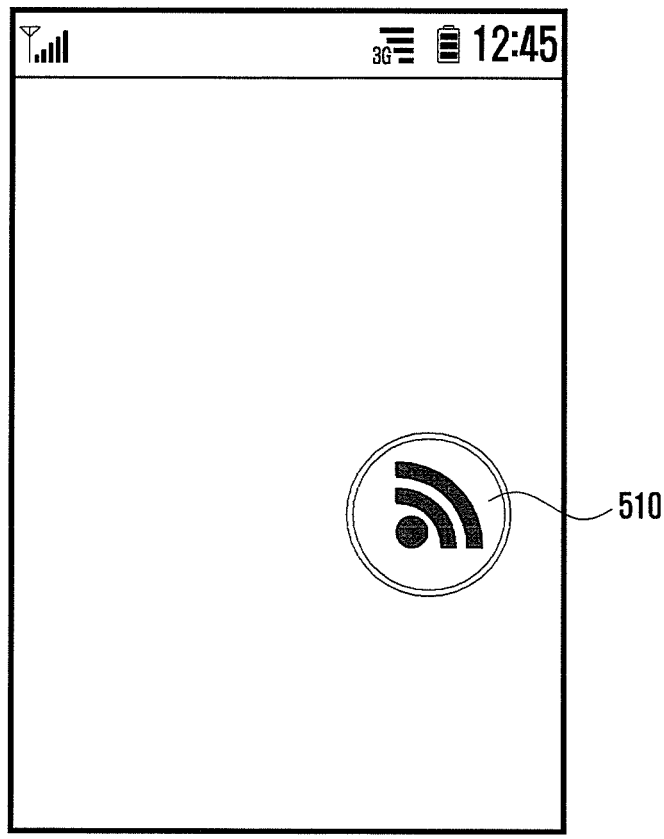

FIG. 4 is a flowchart illustrating a flowchart illustrating a method of moving an object according to a third embodiment of the present disclosure.

Referring to FIG. 4, a controller 170 can operate in a moving mode (401). If the multi-touch is detected and a threshold time (e.g., two seconds) elapse after the multi-touch is detected, the controller 170 can change the operation mode from the standby mode to the moving mode. The controller 170 can provide feedback (e.g., output of effect sound and display of mode change guide message) guiding that the operation mode is changed to the moving mode to the user. The user can recognize that the operation mode is changed from the standby mode to the moving mode and can release the multi-touch according to the feedback. In this case, even if the multi-touch is off, the operation mode maintains the moving mode.

The controller 170 can detect a touch on the touch screen 110 and detect motion of the touch while being operated in the moving mode (402). When the detected motion is flick, the controller 170 can display a movement candidate group on the touch screen 110 in response to a direction of the flick (403). For example, the touch screen 110 can arrange and display contents (e.g., folders, thumbnails) in a grid structure of 4*4 under the control of the controller 170. In this case, the movement candidate group can include a grid located corresponding to a direction of the flick among grids having empty contents. The movement candidate group can include a folder located corresponding to the direction of the flick among grids of 4*4. The controller 170 can display a movement candidate group on the touch screen 110 according to attribute information of an object corresponding to the flick regardless of the direction of the flick or together with the direction of the flick (403). For example, the attribute information can include a file format (e.g., JPEG), a file size, and download date information of the object. For example, when the attribute information of the object represents an image, the movement candidate group can be a folder capable of storing the image.

The controller 170 can detect selection of one candidate from the movement candidate group (e.g., the user taps one from the movement candidate group) (404). When the candidate is selected, the controller 170 controls the touch screen 110 to display an object corresponding to the flick on the selected candidate (405).

After performing step 405, the controller 170 can change the operation mode from the moving mode to a standby mode (406). However, although the performing of step 405 is completed, the operation mode can maintain the moving mode. In this case, the mode change from the moving mode to the standby mode can be achieved by a separate touch gesture (e.g., multi-touch for 2 seconds or longer as described above). Meanwhile, step 404 can be omitted. For example, when there is one candidate corresponding to the direction of the flick, the controller 170 can control the touch screen 110 to display an object corresponding to the flick on the candidate.

FIGS. 5 to 8 are exemplary screen diagrams illustrating a method of moving an object according to an embodiment of the present disclosure.

Referring to FIGS. 5 to 8, the touch screen 110 can display contents 510 in a standby mode under the control of the controller 170. For example, the user can simultaneously touch the contents 510 by a middle finger and an index finger. The controller 170 detects the multi-touch and counts a time from a detection time point. For example, when the multi-touch continues without change of a location for, i.e., two seconds or longer, the controller 170 changes the operation mode from the standby mode to the moving mode. The controller 170 determines the contents 510 as an object to be moved, and can control the touch screen 110 to highlight and display an outline 511 of the contents (hereinafter referred to as 'object') determined as an object as show in FIG. 6. The user can drag the middle finger and the index finger to a right side in a state that the middle finger and the index finger are touched on the touch screen 110 as show in FIG. 7. Then, the controller 170 detects motion of the multi-touch on the touch screen 110. The controller 170 moves the object 510 to a right side in response to the motion of the multi-touch. That is, the touch screen 110 displays motion of the object 510 under the control of the controller 170. The user can move the object 510 to a right side and then touch-off the middle finger and the index finger from the touch screen 110. Accordingly, the contents 510 are fixed to a touch-off location. That is, the touch screen 110 displays the object 510 at the touch-off location under the control of the controller 170 as show in FIG. 8. The controller 170 changes the operation mode from the moving mode to the standby mode in response to the touch-off.

Figure 9:
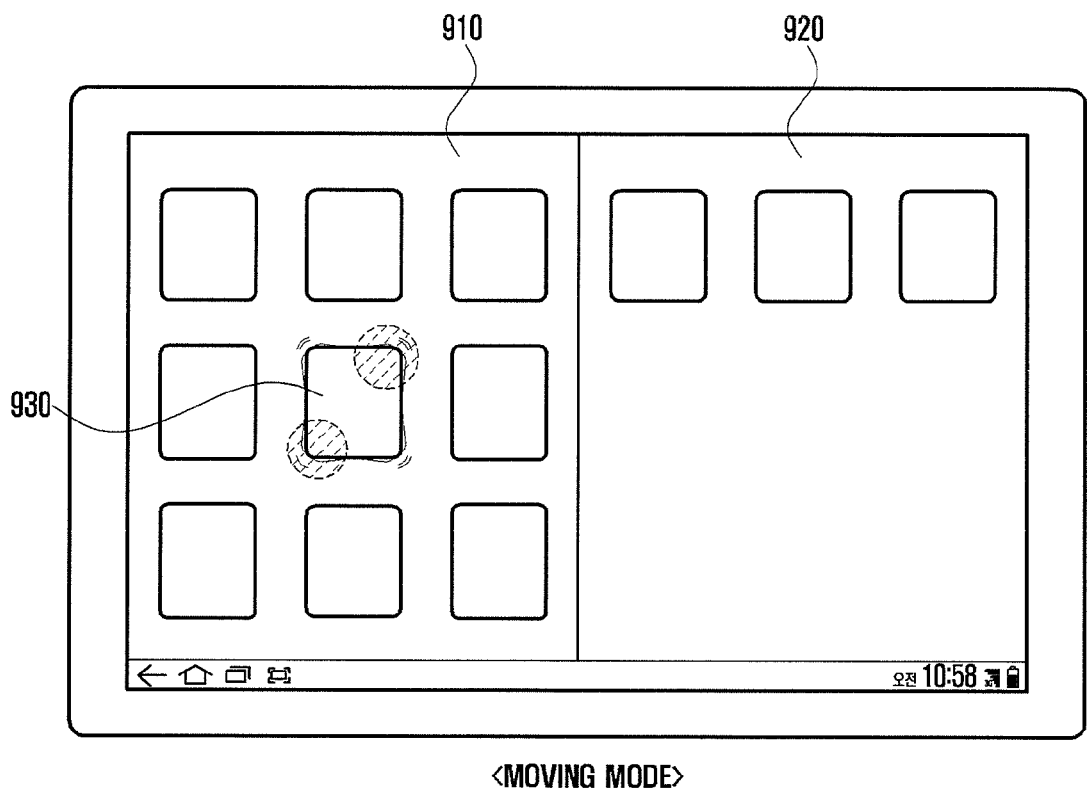
FIGS. 9 to 11 are schematic diagrams of the exemplary screens illustrating methods of moving an object(s) according to another embodiment of the present disclosure.
Figure 10:
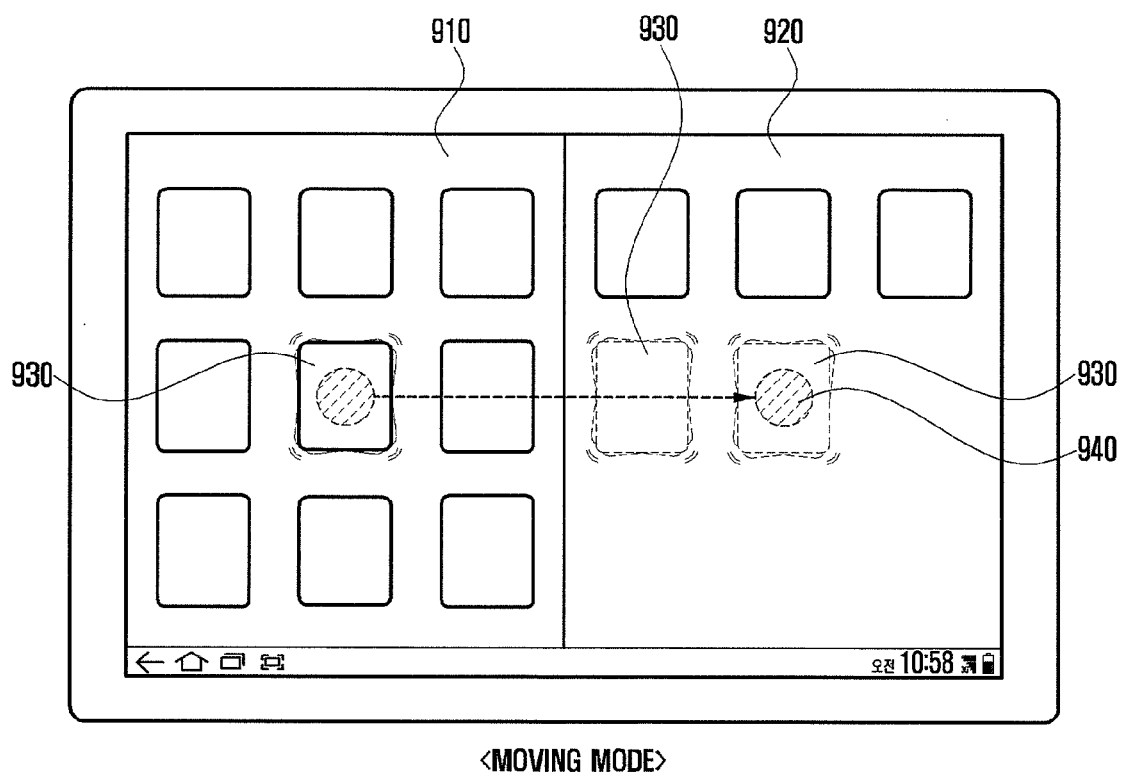
Figure 11:
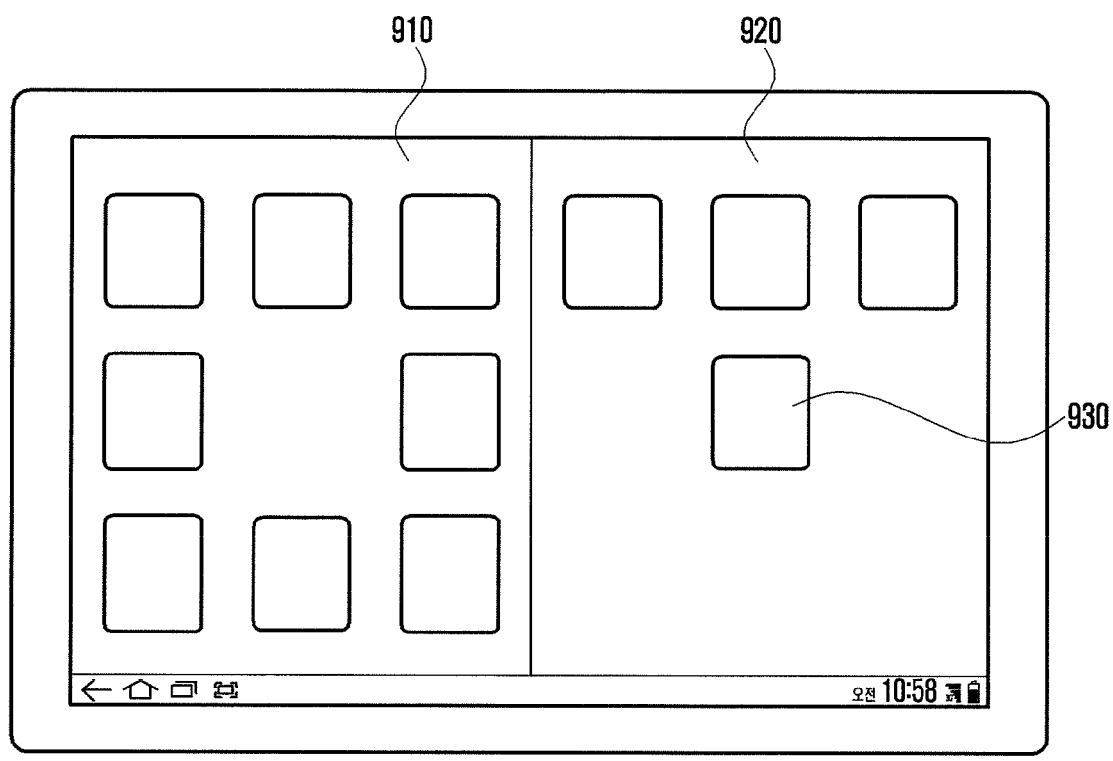

FIGS. 9 to 11 are exemplary screen diagrams illustrating a method of moving an object according to another embodiment of the present disclosure.

Referring to FIG. 9, the touch screen 110 can display contents on a first screen region 910 and display other contents on a second screen region 920 under the control of the controller 170 in a standby mode. For example, the user can simultaneously touch the contents 930 of the first screen region 910 by a middle finger and an index finger. The controller 170 detects multi-touch from the contents 930 and counts a time from a detection time point. For example, when the multi-touch continues without change of a location for 2 seconds or longer, the controller 170 changes the operation mode from the standby mode to the moving mode. The controller 170 determines the contents 930 as an object to be moved, and can control the touch screen 110 to highlight and display content with shaking animation (hereinafter referred to as 'object') 930 determined as the object as show in FIG. 9. Accordingly, the user can recognize that the shaking object 930 is movable. The user can release the multi-touch from the object 930. As described above, even if the release of the multi touch is detected, the controller 170 can maintain the moving mode as the operation mode. The controller 170 can continuously maintain shaking of the object 930.

Referring to FIG. 10, the user can touch the shaking object 930 by a touch input means, for example, an index finger, and move the index finger in a direction of the second screen region 920. Then, the controller 170 detects motion of the touch from the touch screen 110. The controller 170 moves the object 930 in a direction of the second screen region 920 in response to the motion of the touch. That is, the touch screen 110 displays an animation in which the object 930 is moved in a direction of the second screen region 920 under the control of the controller 170. The user can touch an object other than the shaking object 930 by the index finger and move the index finger in a direction of the second screen region 920. However, the controller 170 cannot respond to motion of touch starting from the other object. That is, the controller 170 can respond to only motion of touch with respect to the shaking object 930.

Referring to FIG. 11, the user can touch-off at a center 940 of the second screen region 920. Accordingly, the object 930 is fixed to a touch-off location. That is, the touch screen 110 can display an object 930 at the touch-off center of the second screen region 920 as shown in FIG. 11. The controller 170 can change the operation mode from the moving mode to the standby mode in response to the touch-off. Even if the center 940 of the second screen region 920 is touched-off, the operation mode can maintain the moving mode.

Figure 12:
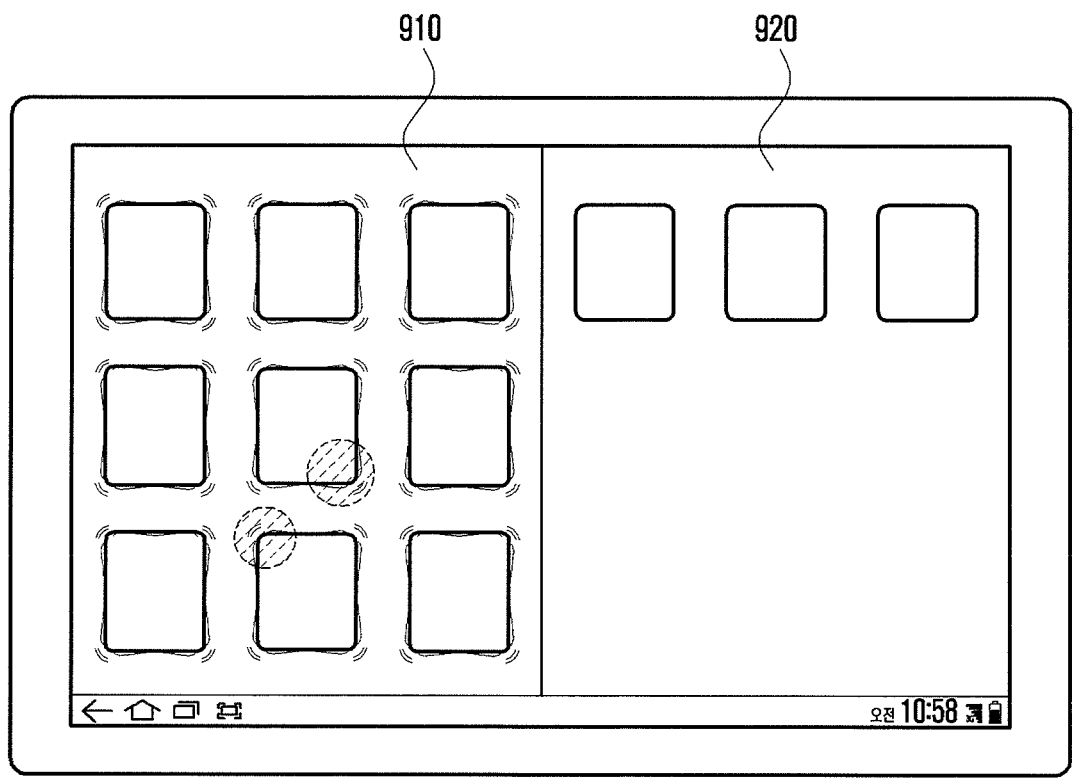
FIGS. 12 to 14 are schematic diagrams of the exemplary screens illustrating methods of moving an object according to still another embodiment of the present disclosure.
Figure 13:
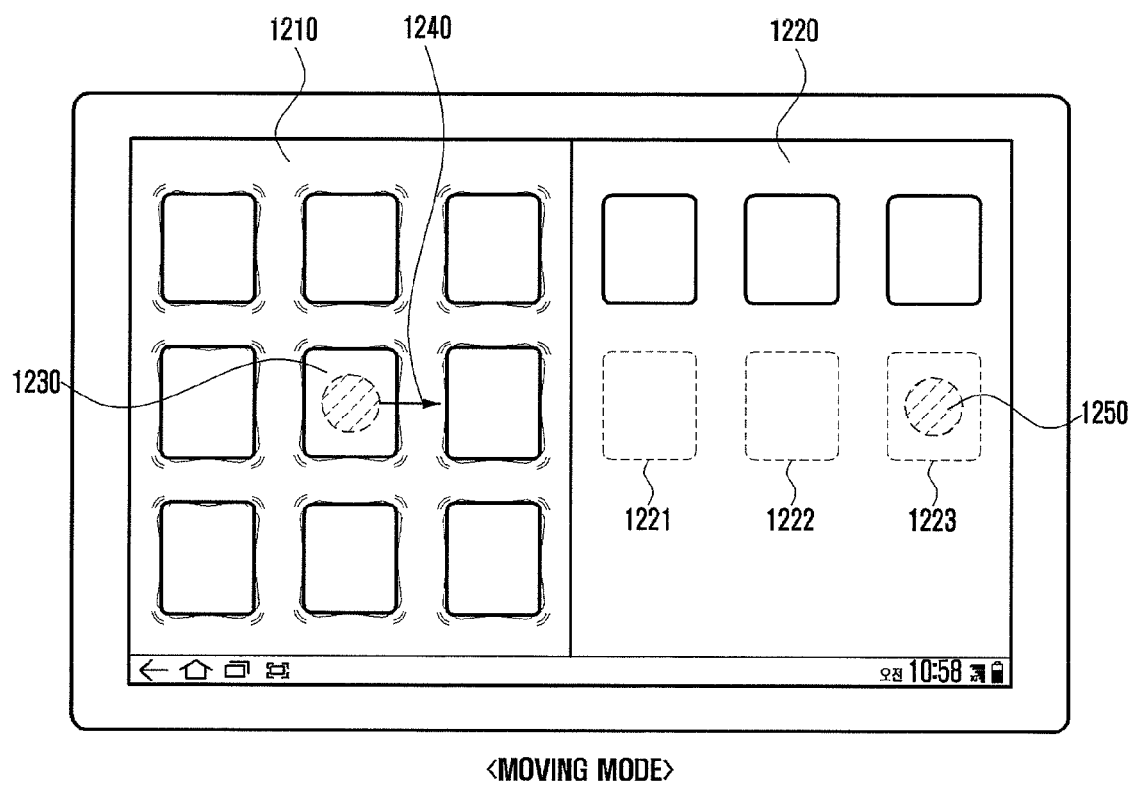
Figure 14:
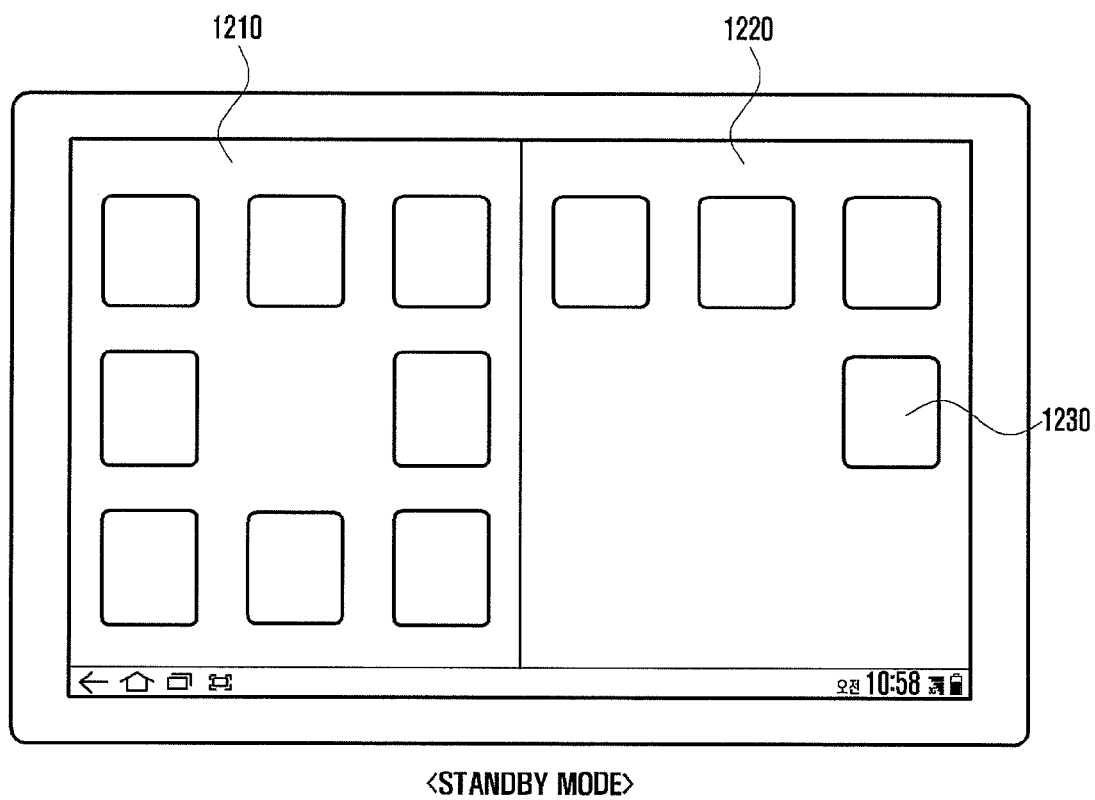

FIGS. 12 to 14 are exemplary screen diagrams illustrating a method of moving an object according to still another embodiment of the present disclosure.

Referring to FIG. 12, the touch screen 110 can display contents on a first screen region 1210 and display other contents on a second screen region 1220 under the control of the controller 170 in a standby mode. For example, the user can simultaneously touch the first screen region 1210 by a middle finger and an index finger. The controller 170 detects multi-touch from the first screen region 1210 and counts a time starting from a detection time point. For example, when the multi-touch continues without change of a location for, i.e., two seconds or longer, the controller 170 changes the operation mode from the standby mode to the moving mode. The controller 170 can control the touch screen 110 to display an animation having all shaking contents of the first screen region as show in FIG. 12. Accordingly, the user can recognize that all contents of the first screen region 1210 are candidates of an object to be moved. The user can release the multi-touch from the first screen region 1210. As described above, even if the release of the multi-touch is detected, the controller 170 can maintain the moving mode as the operation mode. The controller 170 can continuously maintain shaking of all contents of the first screen region 1210.

Referring to FIG. 13, a controller 170 can detect flick 1240 from a first screen region 1210. The controller 170 can control the touch screen 110 to display movement candidate groups 1221 to 1223 on a second screen region 1220 in response to a direction of the flick 1240. For example, the movement candidate group, that is, a first candidate 1221, a second candidate 1222, and a third candidate 1223 correspond to grids (e.g., grid being in a line with a direction of the flick 1240) located corresponding to the direction of the flick 1240 among grids having empty contents. The controller 170 can detect selection (e.g., tap 1250) of the third candidate 1223. Referring to FIG. 14, the controller 170 controls the touch screen 110 to display an object 1230 corresponding to the flick 1240 on the third candidate 1223 in response to the selection of the third candidate 1223.

FIGS. 15 to 19 are exemplary screen diagrams illustrating a method of moving an object according to yet another embodiment of the present disclosure.

Figure 15:
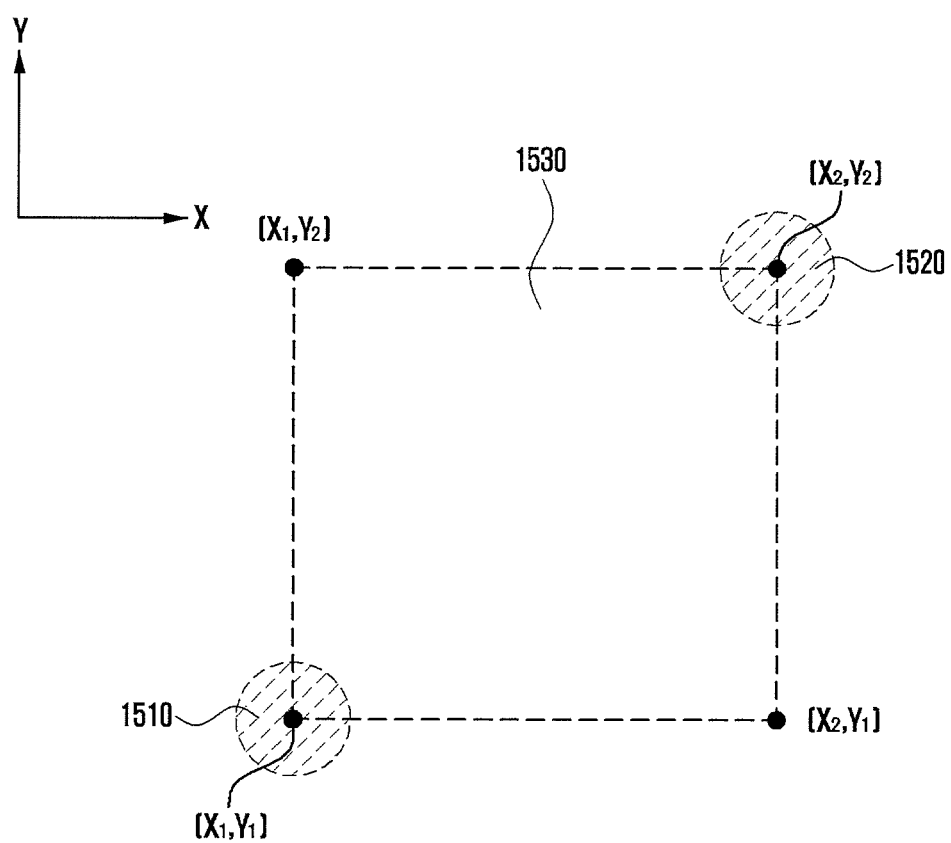
FIGS. 15 to 19 are schematic diagrams of the exemplary screens illustrating methods of moving an object according to yet another embodiment of the present disclosure.

Referring to FIG. 15, a controller 170 can detect a first touched region 1510 and a second touch region 1520 on the touch screen 110. The controller 170 can calculate center coordinate (x1, y1) of the first touched region 1510 and center coordinate (x2, y2) of the second touched region 1520. The controller 170 can calculate a moving region 1530 using the calculated coordinates. That is, the moving region 1530 can have a rectangular shape including vertexes (x1, y2), (x1, y1), (x2, y1) and (x2, y2).

Figure 16:
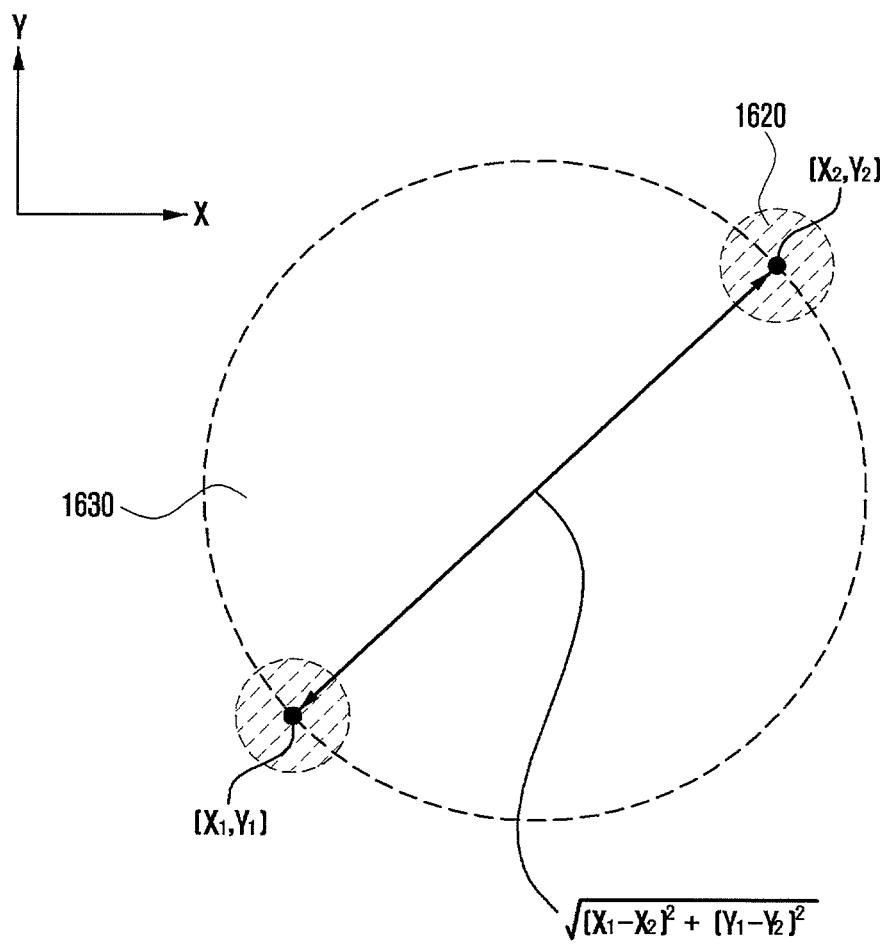

Referring to FIG. 16, the controller 170 can calculate a circle using a distance between center coordinate (x1, y1) of the first touched region and center coordinate (x2, y2) of the second touched region as a diameter, and can determine the circle as an object determination region 1630.

Figure 17:
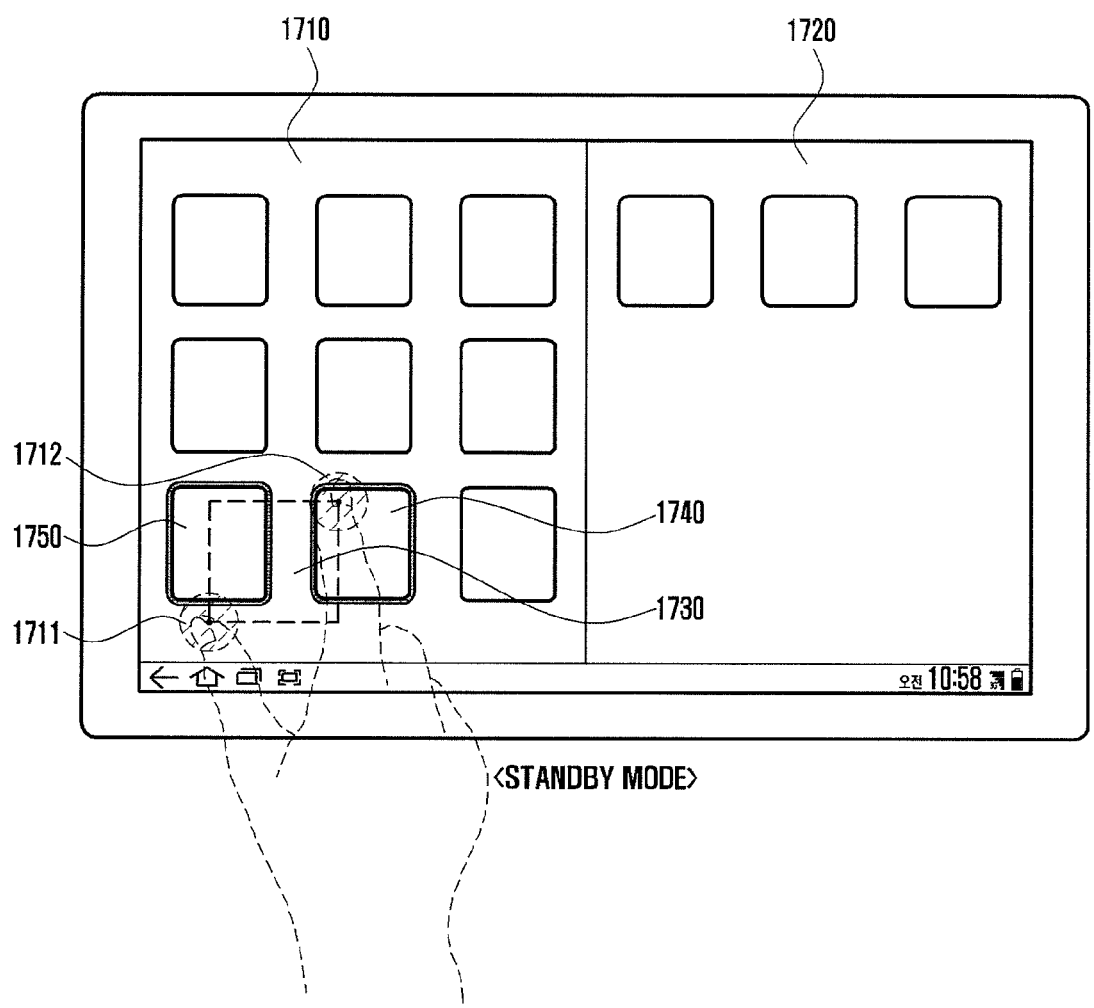

Referring to FIG. 17, the touch screen 110 can display contents on a first screen region 1710 and display other contents on a second screen region 1720 under the control of the controller 170 in a standby mode. For example, the user can simultaneously touch the first screen region 1710 by a middle finger and an index finger. Then, the controller 170 detects the first touched region 1711 and a second touched region 1712. Further, the controller 170 calculates a first moving region 1730 using the first touched region 1711 and the second touched region 1712. The controller 170 highlights the contents 1740 and 1750 whose parts are included in the first moving region 1730 to be identified from other contents. For example, the touch screen 110 can display a thicker outline of a corresponding object under the control of the controller 170.

Figure 18:
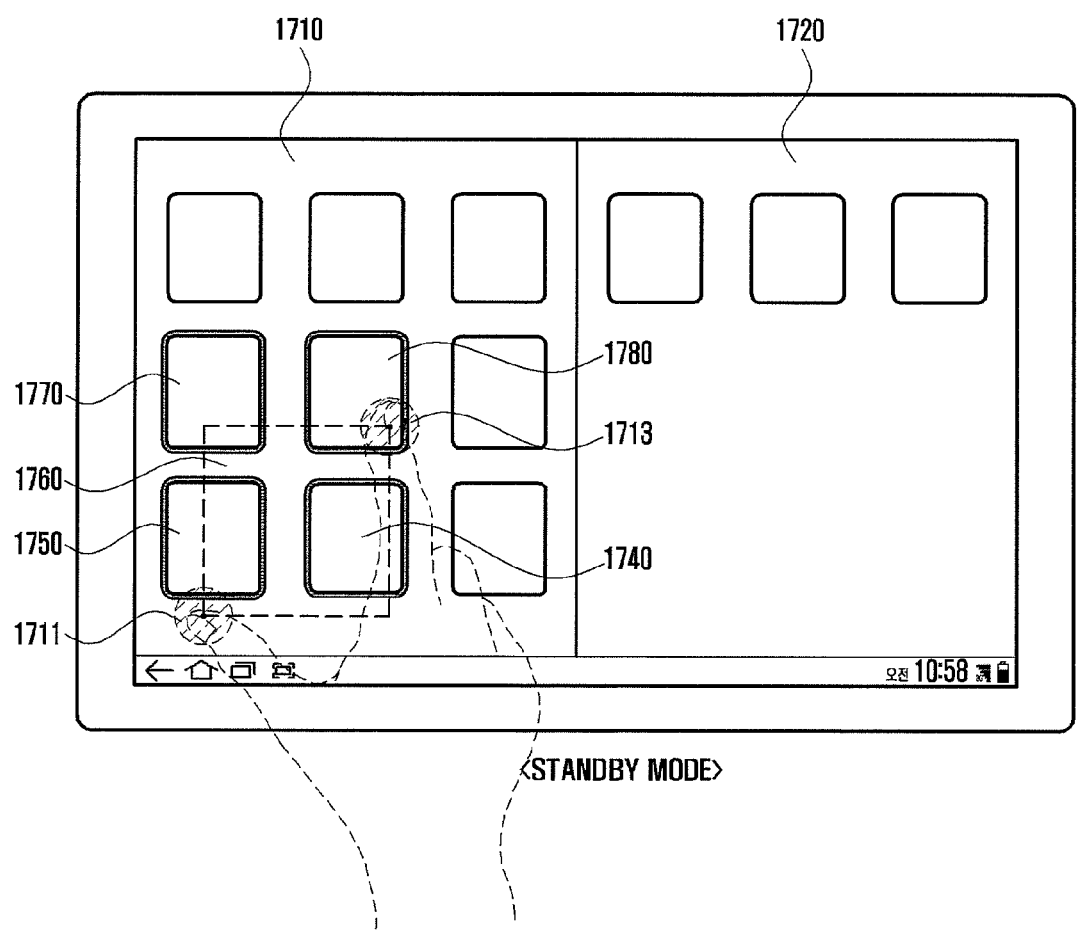

Referring to FIG. 18, the user can move an index finger from the second touched region 1712 to the third touched region 1713 within a threshold time (e.g., two seconds). Accordingly, the controller 170 detects the third touched region 1713. The controller 170 calculates a second moving region 1760 using the first touched region 1711 and the third touched region 1713. The controller 170 highlights the contents 1740, 1750, 1770, and 1780 whose parts are included in the second moving region 1760 to be identified from other contents.

Figure 19:
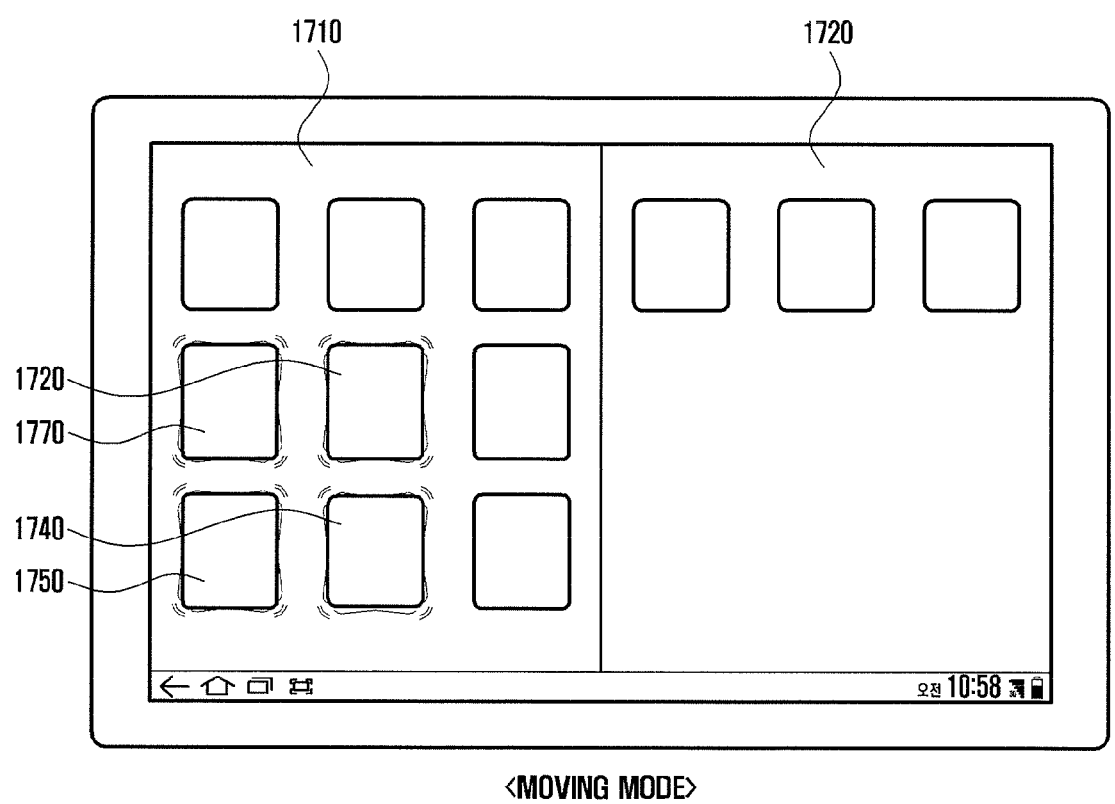

The touch can be conducted on the first touched region 1711 and the third touched region 1713 for a threshold time (e.g., two seconds) or longer. In this case, the controller 170 changes the operation mode from the standby mode to the moving mode. The controller 170 determines the contents 1740, 1750, 1770 and 1780 whose parts are included in the second moving region 1760 as an object to be moved. Referring to FIG. 19, the controller 170 controls the touch screen 110 to display an animation having shaking contents 1740, 1750, 1770, and 1780 determined as the object. The user can recognize that the operation mode is changed from the standby mode to the moving mode according to the feedback (that is, display of the animation), and can release the multi-touch at the first touched region 1711 and the third touched region 1713. In this case, even if the multi-touch is off, the operation mode can maintain the moving mode. As described above, the contents 1740, 1750, 1770 and 1780 determined as the object can be moved to the second screen region 1720 by a flick or a drag.

The foregoing method of the present disclosure can be implemented in an executable program command form by various computer means and be recorded in a computer readable recording medium. In this case, the computer readable recording medium can include a program command, a data file, and a data structure individually or a combination thereof. In the meantime, the program command recorded in a recording medium can be specially designed or configured for the present disclosure or be known to a person having ordinary skill in a computer software field to be used. The computer readable recording medium includes Magnetic Media such as hard disk, floppy disk, or magnetic tape, Optical Media such as Compact Disc Read Only Memory (CD-ROM) or Digital Versatile Disc (DVD), Magneto-Optical Media such as floptical disk, and a hardware device such as ROM, RAM, flash memory storing and executing program commands. Further, the program command includes a machine language code created by a complier and a high-level language code executable by a computer using an interpreter. The foregoing hardware device may be configured to be operated as at least one software module to perform an operation of the present disclosure.

As is seen from the forgoing description, according to the method and the apparatus for moving an object of the present disclosure, the present disclosure may execute the motion of the object through multi-touch, and may execute other functions (e.g., display detailed information of a corresponding object) through single touch.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of moving an object in a terminal having a touch screen, the method comprising:
   detecting a first touch on the touch screen displaying objects;
   determining whether a contact time of a multi-touch exceeds a threshold time when the first touch is the multi-touch;
   changing an operation mode of the terminal from a standby mode to a moving mode when the contact time of the multi-touch exceeds the threshold time, wherein the changing of the operation mode of the terminal from the standby mode to the moving mode comprises determining at least one of the objects to be moved and visually distinguishing the determined at least one of the objects from other objects;
   detecting a second touch on the touch screen;
   moving at least one of the objects in response to motion of the second touch; and
   changing the operation mode of the terminal from the moving mode to the standby mode in response to a release of the second touch, wherein the changing of the operation mode of the terminal from the moving mode to the standby mode comprises terminating the visually distinguishing.

2. The method of claim 1, wherein the changing of the operation mode of the terminal from the moving mode to the standing mode comprises:
   displaying the at least one object at a location corresponding to release of the second touch when the second touch is released; and
   changing the operation mode of the terminal from the moving mode to the standby mode.

3. The method of claim 1, further comprising executing a corresponding function at a location in which the second touch is released.

4. The method of claim 1, wherein the moving of the at least one object comprises:
   displaying a movement candidate group when the second touch is a flick;
   detecting one selected candidate from the movement candidate group through the touch screen; and
   displaying the object at a location corresponding to the selected candidate.

5. The method of claim 1, wherein the changing of the operation mode of the terminal from the moving mode to the standby mode comprises:
   displaying the at least one object on a second screen region when motion of the second touch starts from a first screen region of the touch screen and is released at the second screen region.

6. A portable terminal comprising:
   a touch screen configured to provide a user interface for mutual communication with a user and display an object; and
   a controller configured to:
      detect a first touch on the touch screen,
      determine whether a contact time of a multi-touch exceeds a first threshold time when the first touch is the multi-touch,
      change an operation mode of the terminal from a standby mode to a moving mode when the contact time of the multi-touch exceeds a second threshold time, wherein to change the operation mode of the terminal from the standby mode to the moving mode, the controller is configured to determine at least one of the objects to be moved and visually distinguish the determined at least one of the objects from other objects, and
      control the touch screen to display motion of the object in response to motion of a second touch, and
   change the operation mode of the terminal from the moving mode to the standby mode in response to releasing the second touch, wherein to change the operation mode of the terminal from the moving mode to the standby mode, the controller is configured to terminate the visually distinguishing.

7. The portable terminal of claim 6, wherein the second touch is the multi-touch, and the controller is configured to control the touch screen to display the motion of the object in correspondence to motion of the multi-touch.

8. The portable terminal of claim 6, wherein the controller is configured to control the touch screen to display the at least one object at a location corresponding to release of the second touch or to execute a corresponding function at a location in which the second touch is released.

9. The portable terminal of claim 6, wherein the controller is configured to display a movement candidate group consisting of a plurality of objects when the second touch is a flick, to detect a selected candidate object from the movement candidate group through the touch screen, and to display the object at a location corresponding to the selected candidate object.

10. A non-transitory computer readable recording medium implemented in a terminal having a touch screen, the recording medium comprising a computer program, the computer program comprising computer readable program code that, when executed by processing circuitry, causes the processing circuitry to perform:
    detecting a first touch on the touch screen displaying objects;
    determining whether a contact time of a multi- touch exceeds a threshold time when the first touch is the multi-touch;
    changing an operation mode of the terminal from a standby mode to a moving mode when the contact time of the multi- touch exceeds the threshold time, wherein the changing of the operation mode of the terminal from the standby mode to the moving mode comprises determining at least one of the objects to be moved and visually distinguishing the determined at least one of the objects from other objects;
    moving the at least one of the objects in response to motion of a second touch; and changing the operation mode of the terminal from the moving mode to the standby mode in response to releasing the second touch, wherein the changing of the operation mode of the terminal from the moving mode to the standby mode comprises terminating the visually distinguishing.

\* \* \* \* \*